(No Model.) 2 Sheets—Sheet 2.
F. J. CROUCH.
APPARATUS FOR HEATING CARS.
No. 380,247. Patented Mar. 27, 1888.
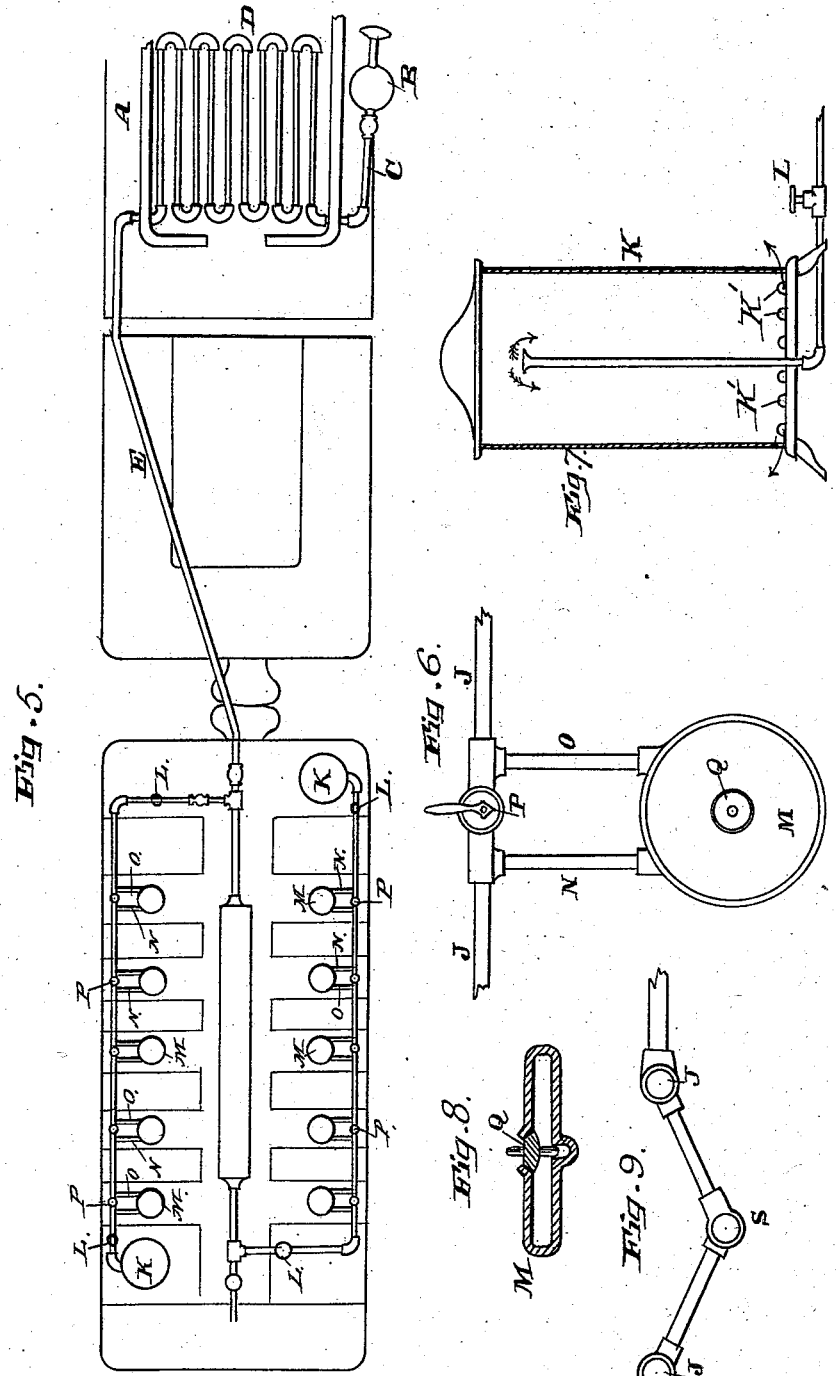
Witnesses,
Geo. H. Strong
J. A. Rouse
Inventor,
F. J. Crouch
By Dewey & Co.
Atty

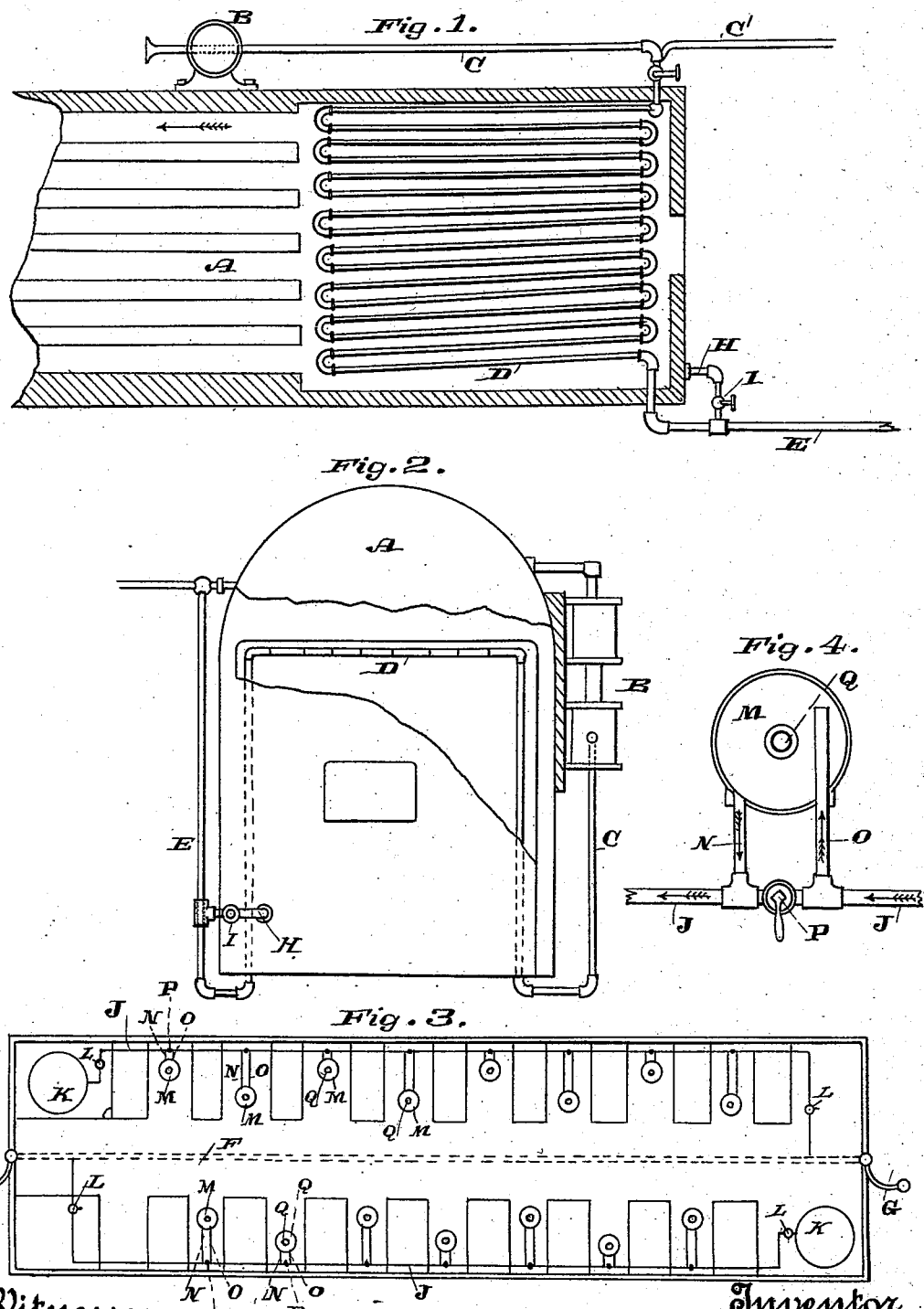

UNITED STATES PATENT OFFICE.

FRANK J. CROUCH, OF OAKLAND, OREGON.

APPARATUS FOR HEATING CARS.

SPECIFICATION forming part of Letters Patent No. 380,247, dated March 27, 1888.

Application filed April 2, 1887. Serial No. 233,464. (No model.)

*To all whom it may concern:*

Be it known that I, FRANK J. CROUCH, of Oakland, Douglas county, State of Oregon, have invented an Improvement in Apparatus for Heating Cars; and I hereby declare the following to be a full, clear, and exact description of the same.

My invention relates to a means for heating cars of railway-trains.

It consists in the constructions and combinations of devices which I shall hereinafter fully describe and claim.

Referring to the accompanying drawings for a more complete explanation of my invention, Figure 1 is a horizontal section taken through the upper part of the fire-box of a locomotive, showing the heater and also the air-pump and connecting-pipes applied to the engine. Fig. 2 is a rear view of the boiler, with a portion broken away to show the heater, showing, also, the air-pump and connecting-pipes. Fig. 3 is a plan of the car-floor, showing the relative position of the seats and the pipes, drums, and foot-pans. Fig. 4 is an enlarged view of a foot-pan or distributer. Fig. 5 is a modification, to be hereinafter described. Figs. 6, 7, 8, and 9 are details on an enlarged scale.

A represents a locomotive-boiler, having an air-pump, B, fixed to it, so as to be operated by steam supplied from the locomotive-boiler in the same manner as the air-pumps which operate the air-brakes. This pump being well known, no details of its construction are necessary here. The same pump may supply the air-brakes and the heater by using a suitable coupling for the necessary branches in the pipes, as shown at C'.

C is a pipe leading from the air-cylinder of the pump and connecting with a series of pipes, D, which are preferably fixed in the upper part of the fire-box of the locomotive, as shown, so that the air passes backward and forward through these pipes a sufficient number of times to become heated to a high temperature. It is then conveyed out through a pipe, E, which leads back and is connected with pipes F, passing through the cars, suitable flexible couplings, G, being made at the points where the cars meet.

H is a steam-pipe leading from the boiler into the air-pipe E, and I is a cock or valve, which may be opened so as to inject a small portion of steam into the air-pipe, which, being so highly heated, would be too dry without this addition. The air may thus be moistened to any desired degree, so as to be rendered healthy and respirable.

The main hot-air pipe preferably passes through or beneath the central portion of the car, and should be of considerable diameter. It is covered, preferably, by asbestus, so as to retain the heat, and as the air is forced into it under considerable pressure it will hold a quantity which will be sufficient for the needs of the car for several hours in case the car becomes separated from the remainder of the train. The couplings at each end of these pipes are fitted with automatically-closing valves, in the same manner as the pipes of the air-brakes, so that the air will not escape if the coupling be accidentally separated from this main pipe. In the present case I have shown smaller pipes, J, which lead out from the main one and pass along each side of the car, and pass upward through the bottom of large drums K, which are placed at the ends of the car and have escape-openings K' at the bottom, (see Fig. 7,) so that the air passing into these drums will heat them, and heat will be radiated from the surface of the drums, while the hot air itself will be allowed to escape through the openings into the car.

Suitable cocks or valves, L, control the heat, which passes into these pipes, and may be opened or closed at will.

Between each two seats of the car is fitted a pan or distributer, M, which is conveniently arranged so that a passenger may place his feet upon it, if desired, the side branch pipes, J, having short pipes N and O opening from them into these foot-pans, and a cock or valve, P, is fixed in the pipe J between the two short pipes N and O, so that when this valve is closed the heat from the pipe J must pass into the pan through one of the pipes, and thence out and back into the pipe J again, thus continuing it through all of these drums or pans, if the valves of each be closed, as described.

In the top of the pan is fitted a valve or valves, Q, (see Figs. 6 and 8,) which close upwardly and have a small stem projecting up through the top, by which they may be opened, if desired.

If a passenger be troubled with cold feet or limbs, it is only necessary to place the foot upon this stem, pressing it down so as to open the valve Q, and this allows the hot air to escape from the interior of the pan, and will soon warm the feet and limbs as much as may be desired. By this construction the passengers in each seat will have control of the especial foot-pan or warming apparatus which connects with that seat, and may turn the air into it or out at will.

The whole apparatus is easily managed, and the cars may be heated in a short time after the train is made up and the locomotive connected with it. There will be no danger from fires in cases of accidents, as there are none in the cars, and from the numerous pipes of distribution the atmosphere of the car may be maintained at a comfortable temperature at all times.

As the air is delivered fresh from the air-pump from the outside and moistened by the steam which is admitted into the pipes, it provides the car at all times with pure respirable air, the foul air being driven out through the various ventilating-apertures of the car.

Having thus described my invention, what I claim as new, and desire to secure by Letters Patent, is—

In a car-heating apparatus, the pipes J, having branch pipes N and O connecting therewith, and the foot-pan or distributer, into which said pipes lead, in combination with valves or cocks in pipe J between the branch pipes, and the valves Q in the top of the distributers, having a projecting stem, whereby said valves may be opened to allow air to escape around the feet, substantially as described.

In witness whereof I have hereunto set my hand.

FRANK J. CROUCH.

Witnesses:
J. L. HENDRICKS,
GEO. F. CRAW.